UNITED STATES PATENT OFFICE.

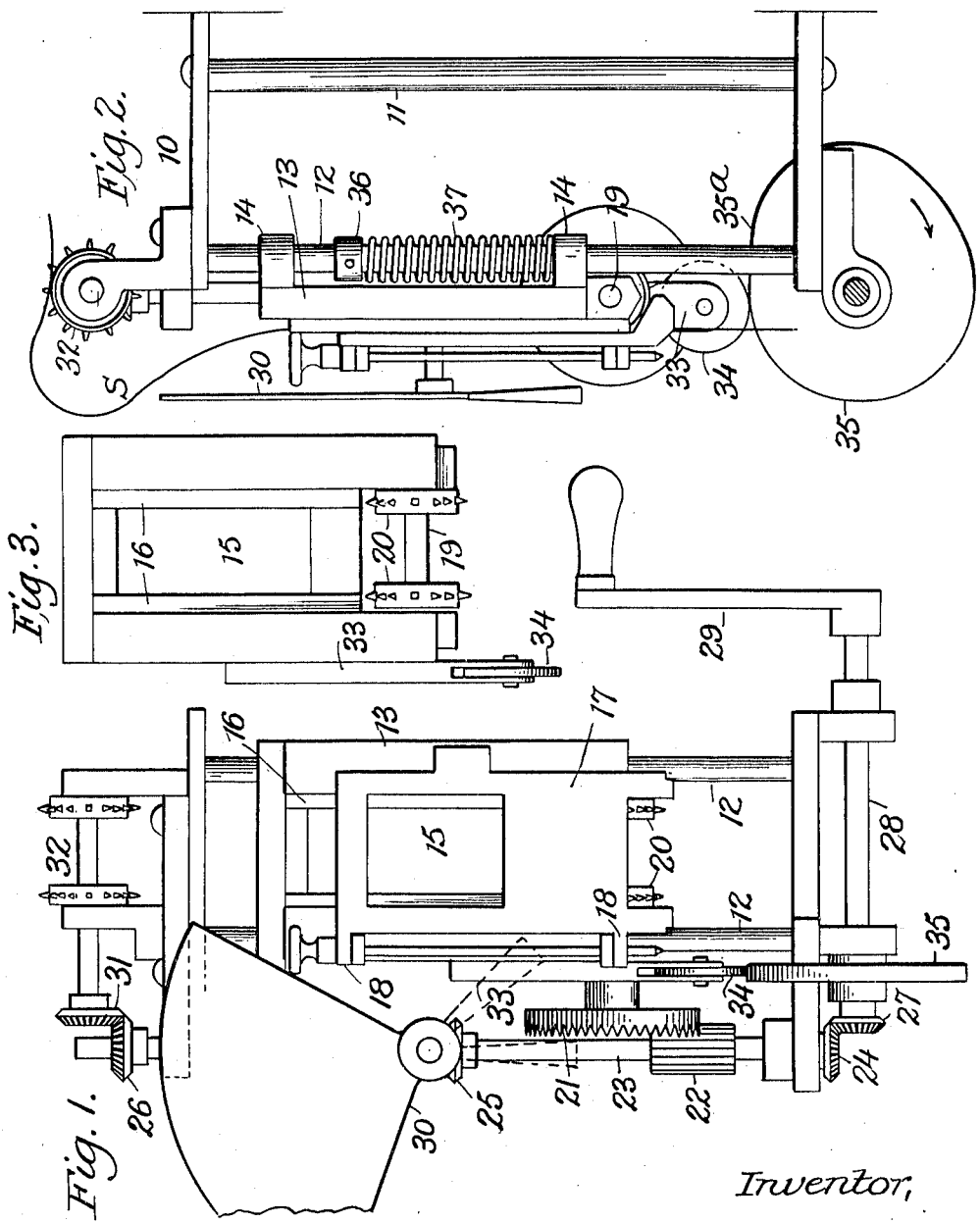

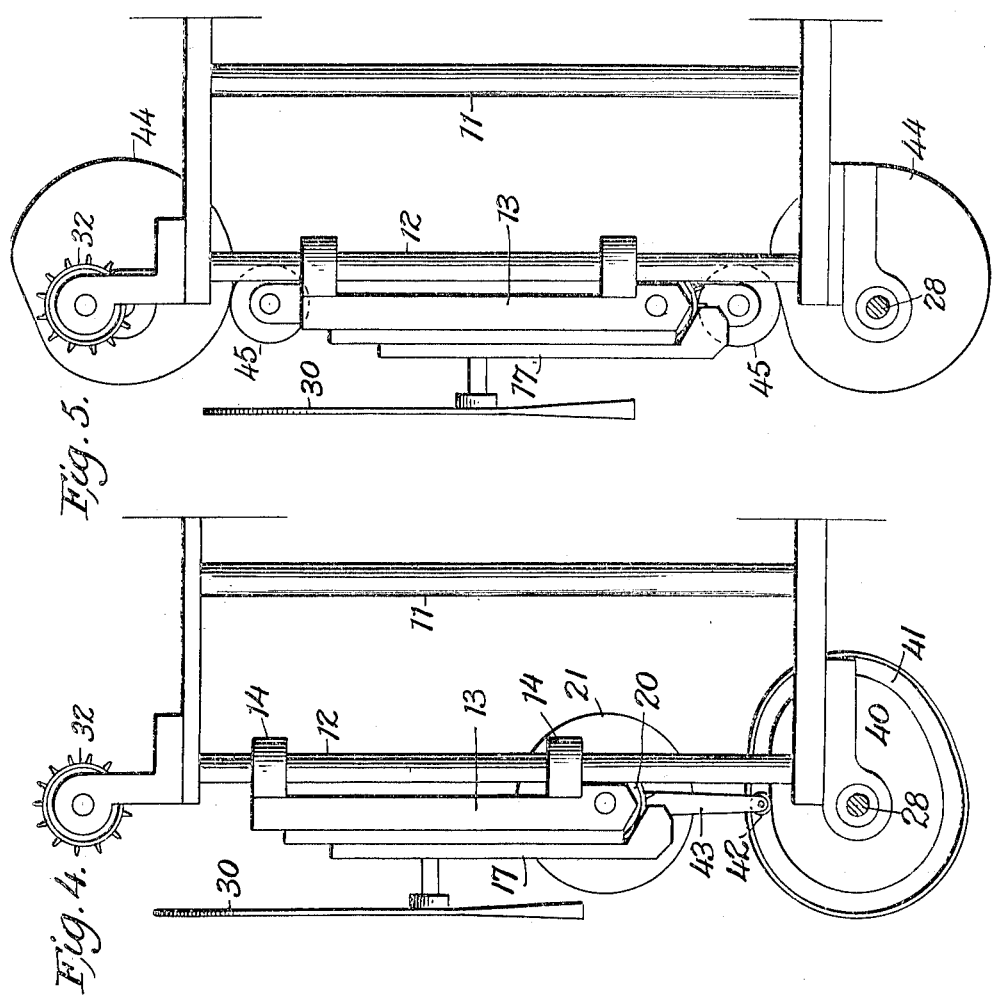

CHARLES R. UEBELMESSER, OF NEW YORK, N. Y., ASSIGNOR, BY MESNE ASSIGNMENTS, TO LUDWIG G. B. ERB AND JOSEPH A. GOLDEN.

MOVING-PICTURE MACHINE.

1,019,929.  Specification of Letters Patent.  Patented Mar. 12, 1912.

Application filed January 13, 1906.  Serial No. 295,885.

*To all whom it may concern:*

Be it known that I, CHARLES R. UEBELMESSER, a citizen of Germany, and a resident of the borough of Brooklyn, county of Kings, and city of New York, N. Y., have invented certain new and useful Improvements in Moving-Picture Machines, of which the following is a specification.

This invention relates to moving picture machines and more particularly to the mechanism for feeding the picture film.

The device is adapted to intermittently feed the film without putting upon it any increased strain or tension while moving. I accomplish this by passing the tape over a sprocket feed roller revolving without intermission and at uniform speed, while its axis reciprocates, receding while the film is at rest and moving forward while the film is in motion, as will now be explained, reference being had to the following description, the claims and the drawings, in which—

Figure 1 is a front view of the device. Fig. 2 is a side view of same. Fig. 3 is a detail view of the film feeding frame without its cover. Fig. 4 is a side view of a modified form of the device. Fig. 5 is a side view of another modified form of the device.

The device to be described is adapted to be suitably mounted in a moving picture apparatus and in line with the light and lenses of said apparatus, so that the pictures of the film hereinafter referred to will be projected and magnified upon a screen. It is not necessary to more fully illustrate the application of this device as the types of apparatus with which it may be connected are many and well known.

In this device horizontal brackets, 10, are united by stays, 11, and the guide rods, 12, the latter carrying a shifting film feeding frame, 13, with perforated lugs, 14, through which the rods 12 pass. The frame 13 has an opening, 15, over which the picture film travels and through which the light passes. It further has in its outer side a shallow groove, 16, wider than the opening 15 and in this groove the film freely moves and is held from displacement by a lid 17 hinged at 18 to the feeding frame 13. In the lower end of the feeding frame is journaled the shaft 19 of sprocket wheels 20, the latter being connected to form a sprocket feed roller, in which the sprockets engage perforations at each side of the transparent film, which operation is the common means employed to feed the film in this class of apparatus.

The outer end of shaft 19 carries a crown wheel 21 meshing with an elongated pinion 22, on a vertical shaft 23, the latter carrying three miter gear wheels 24, 25 and 26, of which the former is geared with an operating wheel 27 on a shaft 28 and is rotated by a handle, 29, or other suitable means. The wheel 25 operates a shutter 30 of usual construction, and the wheel 26, through its companion wheel 31, rotates upper feed rollers, 32, connected like the sprocket wheels 20 so as to form another sprocket feed roller, revolving on a stationary axis.

On one side of the feeding frame 13 is a bracket 33 having a lower forked end carrying a roller 34 which is actuated by a revolving cam 35, on the driving shaft 28. The guide rods 12 have screwed to them collars 36 between which and the lower lug 14 and encircling the rods are coiled springs 37, under compression and tending to keep the roller 34 against the revolving cam 35.

As will be seen in Fig. 2, there is a certain amount of slack or a loop as at S in the film between the two sets of feed rollers, and this slack is necessarily outside of the feeding frame 13.

With the rotation of the shafts 28 and 23, the sprocket feed wheels are put in motion and the tendency of the picture film is to move down the groove 16, while the revolving cam or eccentric, 35, acting on the roller 34 moves the film upward at the same rate of speed at which the lower rollers move it downward, thus leaving it stationary until the elevating edge of the cam or that part of the edge of the cam that is at the greatest distance from the axis 28 has passed the roller 34, when the sharp decline 35ª in the cam wheel 35 causes the frame 13 to suddenly return to its lowest point as shown in Fig. 2. The loop S provides ample reserve of film for this movement without in any way stretching or putting any extra tension on the film. The sprocket wheels 20 and 32 are so geared that a fresh loop or slack portion is provided after each descent of the lower feed roller so that there is nothing to interfere with the regularity of this movement which is a most important one to secure speed and preserve the film from tearing.

In Fig. 4 is illustrated a means for operating the frame 13 without the use of springs. In this construction a cam 40 is employed, having a groove, 41, in its side, in which plays a roller 42 carried by a bracket or arm 43, depending from the feeding frame 13. This means secures a more positive movement to the reciprocating frame.

Fig. 5 illustrates another means for securing a positive movement of the film carrying frame. In this case are employed two cams 44, one at each end of the device and adapted to act upon the rollers 45 carried by the feeding frame. These two last devices serve to illustrate some of the various means that may be used to secure the reciprocation of the feeding frame while the continuously moving feed roller is moving the film intermittently so as to give the required periods of rest for exposure to light and projection upon a screen.

On account of the fact that during the rapid movement of the lower feed roller, the requisite amount of film is furnished by the loop or slack that always is in readiness, this rapid movement is effected without any strain on the film. This is of great advantage, as thereby the periods of exposure can be correspondingly prolonged and the feeding of the film may be made as fast as it may be passed over a uniformly revolving feed roller.

I do not limit myself to the exact means shown for changing continuous motion to intermittent nor do I limit myself to the use of the features shown in living picture machines, as other uses exist therefor.

What I claim as new is:

1. In a moving picture machine, the combination of a sprocket feed roller and a crown wheel, a shaft on which these are mounted, an elongated pinion adapted to revolve the shaft and means for causing the shaft to reciprocate.

2. In a moving picture machine, the combination of a sprocket feed roller and a crown wheel, a shaft on which these are mounted, an elongated pinion adapted to impart a continuous revolution to the shaft and means for causing the shaft to reciprocate.

3. In a moving picture machine, the combination of a reciprocating frame, cams for reciprocating the frame, film-feeding means mounted on the frame and adapted to rotate as said frame reciprocates, and means for rotating said film-feeding means.

4. In a moving picture machine, the combination of a reciprocating frame, means for actuating the frame, a feed roller mounted on a shaft and carried by the frame and adapted to rotate as said frame reciprocates, a crown wheel on the shaft of the feed roller, an elongated pinion meshing with the crown wheel and means for driving the pinion.

Signed at New York this 10th day of Jan., 1906.

CHARLES R. UEBELMESSER.

Witnesses:
C. A. O. ROSELL,
M. L. CHETEJIAN.